UNITED STATES PATENT OFFICE.

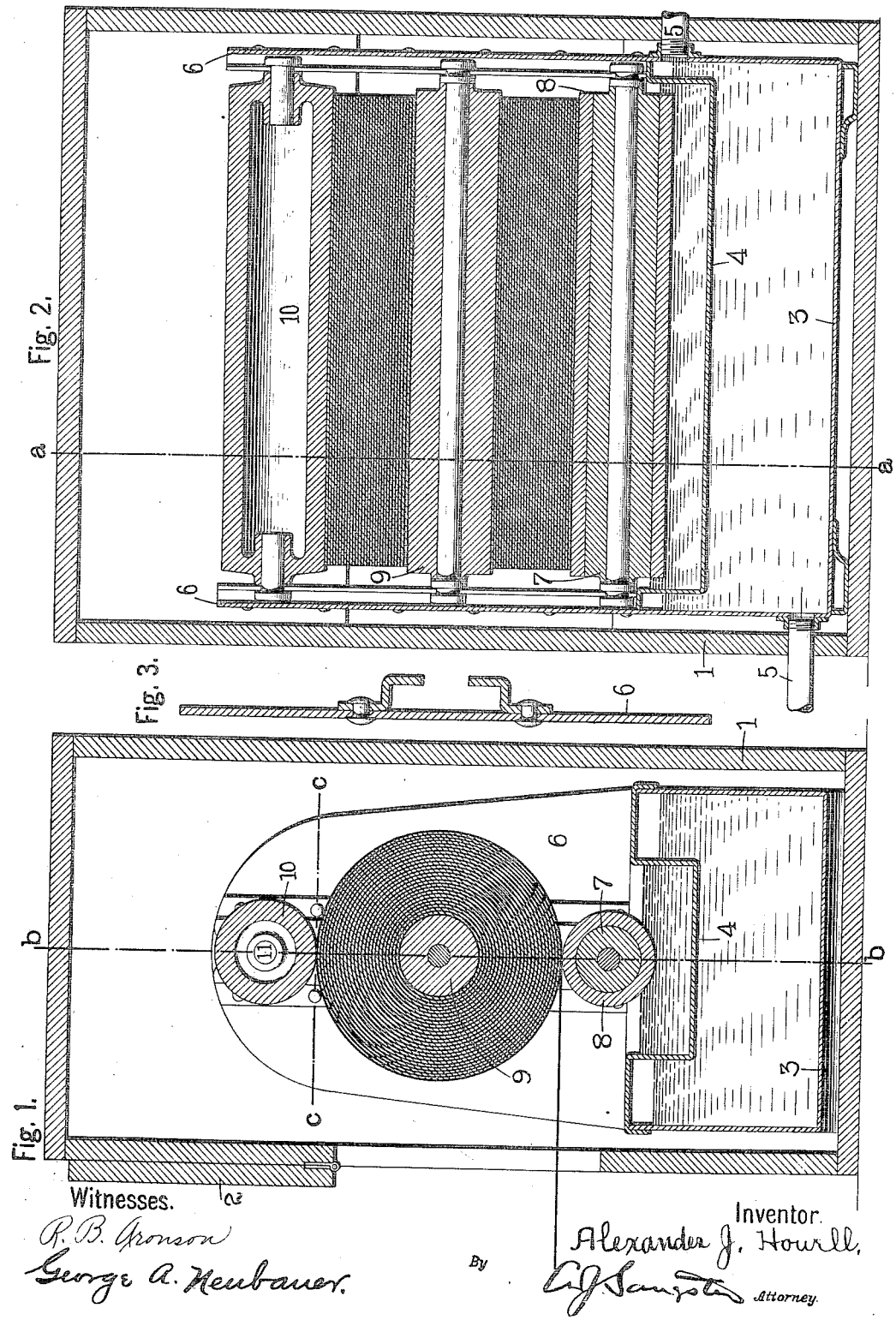

ALEXANDER J. HOWELL, OF SYRACUSE, NEW YORK.

PROCESS OF COATING TIN-FOIL AND THE RESULTING PRODUCT.

1,044,656.

Specification of Letters Patent.

Patented Nov. 19, 1912.

Application filed April 28, 1910. Serial No. 558,115.

*To all whom it may concern:*

Be it known that I, ALEXANDER J. HOWELL, a subject of the King of Great Britain, residing at Syracuse, in the county of Onondaga and State of New York, have invented certain new and useful Improvements in Processes for Coating Tin-Foil and the Resulting Product, of which the following is a specification.

This invention relates to a process for coating tin-foil with paraffin, and also to the improved material produced thereby.

The principal object of the invention is to secure an even distribution of the paraffin on the surface of the tin-foil in the form of an exceedingly thin sheet or film of paraffin which is associated very closely with the surface of the tin-foil, and will adhere strongly to the surface thereof, and which will bend or flex with the tin-foil without cracking, chipping or loosening from the surface thereof. To attain this object, both the tin-foil and paraffin are heated to about the same temperature, a temperature which is sufficient to melt the paraffin to a liquid state, but not sufficient to melt the tin-foil. An exceedingly thin coat of the melted paraffin is distributed on the tin-foil surface under pressure, and the coated sheet of tin-foil is then permitted to cool.

A preferred form of apparatus capable of carrying out this process, is shown in the accompanying drawings, in which,—

Figure 1 represents a transverse section through the apparatus on line *a a*, Fig. 2. Fig. 2 represents a longitudinal section through the apparatus on line *b b*, Fig. 1. Fig. 3 is an enlarged detached horizontal section through one of the side members of the frame for supporting the rollers, on line *c c*, Fig. 1.

In referring to the drawings, in detail, like numerals designate like parts.

In this process, both the tin-foil and the paraffin are heated to a sufficient temperature to melt the paraffin, but not the tin-foil. The paraffin in its melted, or liquid state, is then evenly distributed on the surface of the tin-foil, and the coated tin-foil is then drawn out in a flat condition and permitted to gradually cool. When the coated foil has thoroughly cooled, it will be found that the even layer, or film of paraffin, is very closely associated with the surface of the foil, and adheres very strongly thereto. The heating of the tin-foil dries off any moisture or air on the surface or in the pores of the same and thus permits a closer and more intimate association of the paraffin with the tin-foil surface.

The preferred apparatus for carrying out this process is shown in the accompanying drawings, and consists of an outer box or closed receptacle 1, having a portion of its side 2 hinged to the remainder and adapted to open, as shown in Fig. 1, to permit the withdrawal of the tin foil. Within the box 1, is arranged a closed metal tank 3, the top of which is depressed or recessed to form a pocket or pan 4, in which the paraffin is melted.

The tank 3 is connected to a suitable source of steam supply by pipes 5. However, other means of heating the tank may be employed.

Two vertical standards 6 extend upward from the opposite ends of the tank, and angular members or parts, arranged in opposed parallel position, are attached to the inner surface of each standard, as shown in Fig. 3, and form vertical slide ways in which the ends of rollers are rotatably mounted, so as to be capable of vertical adjustment.

The lower roller 7, has the ends of its shaft rotatably mounted in the slide ways, as before described, and is provided with a peripheral cover 8 of absorbing material, such as cheese cloth, for instance. The lower surface of this roller is immersed in the melted paraffin in the pocket or pan 4. This lower roller will hereinafter be termed the paraffin transferring roller.

Above the paraffin transferring roller is located a roller 9, on which the tin-foil is wound in a long spiral strip. The roller 9 has projecting shaft ends, which are likewise rotatably mounted in the vertical slide ways, so as to have both a turning movement and a vertical adjusting movement therein.

The tin-foil roller is always held in pressing contact with the paraffin transferring roller by gravity, owing to the weight of the tin-foil. Ordinarily, the weight of the tin-foil roller will be sufficient to give the desired pressure, and thus secure a very thin layer or coat of the paraffin on the tin-foil. However, a weighted upper roller 10 is illustrated in the accompanying drawings, as arranged above the tin-foil roller. This roller also has projecting shaft ends 11, which are rotatably mounted in the slide ways and also are capable of vertical adjustment therein.

In carrying out the improved process by this apparatus, the tin-foil is drawn off the tin-foil roller gradually, which slowly turns the lower paraffin transferring roller and brings the absorbing covering of the paraffin transferring roller in contact with the surface of the tin-foil sheet, and distributes a very thin and even coating of paraffin on the surface of the tin-foil. The tin-foil, after it is coated, is drawn out of the box through the opening left by raising the hinged portion of the side of the box, and is cut in suitable lengths and placed in flat condition on a table or other suitable support and allowed to cool.

I have found by experience that it is practically impossible to coat a metallic sheet, such as tin-foil, with paraffin while the paraffin was in a cold unmelted state, as the paraffin cannot be rolled thin enough, or forced into the pores or interstices of the tin-foil surface; and furthermore, paraffin cannot be rolled in a cold state under pressure, owing to the fact that it would be broken or cracked up into a multiplicity of fragments. With my process, the paraffin while in a melted state, is distributed upon, and forced into perfect association with the heated and dried off surface of the tin-foil, thoroughly and evenly coating the surface with an exceedingly thin layer of paraffin, which when cold, will adhere or stick very strongly to the tin-foil surface, and which will bend or flex in unison with the tin-foil without separating from the surface thereof, or cracking or chipping. This is due to the fact that exceedingly close adhesion is secured between the tin-foil and the film of paraffin, a portion of the inner surface of the paraffin being practically forced into and locked into the pores or interstices of the tin-foil surface.

The improved product, paraffin coated tin-foil, produced by this process, is utilized chiefly as a medium for incasing unpreserved food products to protect them from contamination by the atmosphere, the paraffin serving to separate and entirely isolate the tin-foil surface from the surface of the food product.

What I claim is:

1. A process for coating tin-foil with paraffin, which consists in melting the paraffin with the application of heat, then coating the heated tin-foil surface with a layer of the melted paraffin under pressure, finally permitting the paraffin coated tin-foil sheet to cool, said paraffin layer being thin enough to be capable of flexing with the tin-foil sheet without loosening therefrom or cracking.

2. A process for coating tin-foil with paraffin, which consists in heating both the tin-foil and paraffin to about the same temperature which is sufficient to melt the paraffin, and dry off any air or moisture upon the surface or in the pores of the tin-foil surface but not sufficient to melt the tin-foil, then coating the tin-foil surface while in a heated condition with a thin layer of the melted paraffin under pressure, finally permitting the paraffin coated tin-foil sheet to cool, said paraffin layer being thin enough to be capable of flexing with the tin-foil sheet without loosening or cracking.

3. A tin-foil-sheet coated with an exceedingly thin layer of paraffin when both are hot, whereby the paraffin surface is in strong and perfect adhesion with the surface of the tin-foil, and is capable of flexing with the tin-foil sheet without loosening therefrom or cracking.

In testimony whereof I affix my signature in presence of two witnesses.

ALEXANDER J. HOWELL.

Witnesses:
EUSTACE C. OWEN,
J. M. GUNNELL.